United States Patent
Coleman

(10) Patent No.: US 11,830,290 B2
(45) Date of Patent: Nov. 28, 2023

(54) SYSTEMS AND METHODS FOR DRIVER IDENTIFICATION USING DRIVER FACING CAMERA OF EVENT DETECTION AND REPORTING SYSTEM

(71) Applicant: Bendix Commercial Vehicle Systems, LLC, Elyria, OH (US)

(72) Inventor: Jeffrey R. Coleman, Elyria, OH (US)

(73) Assignee: Bendix Commercial Vehicle Systems, LLC, Avon, OH (US)

( * ) Notice: Subject to any disclaimer, the term of this patent is extended or adjusted under 35 U.S.C. 154(b) by 82 days.

(21) Appl. No.: 17/315,002

(22) Filed: May 7, 2021

(65) Prior Publication Data
US 2022/0358307 A1   Nov. 10, 2022

(51) Int. Cl.
| | |
|---|---|
| G06V 40/16 | (2022.01) |
| G07C 5/08 | (2006.01) |
| G06K 7/14 | (2006.01) |
| G06V 20/40 | (2022.01) |
| G06V 20/59 | (2022.01) |

(52) U.S. Cl.
CPC ......... *G06V 40/172* (2022.01); *G06K 7/1413* (2013.01); *G06K 7/1417* (2013.01); *G06V 20/40* (2022.01); *G06V 20/59* (2022.01); *G06V 20/597* (2022.01); *G07C 5/0841* (2013.01); *G06V 20/44* (2022.01)

(58) Field of Classification Search
CPC .... G06V 40/172; G06V 20/59; G06V 20/597; G06V 20/40; G06V 20/44; G06K 7/1413; G06K 7/1417; G07C 5/0841
See application file for complete search history.

(56) References Cited

U.S. PATENT DOCUMENTS

| | | | |
|---|---|---|---|
| 7,551,064 B2 | 6/2009 | Pudelko et al. | |
| 7,812,712 B2 | 10/2010 | White et al. | |
| 8,672,224 B2 | 3/2014 | Lebaschi et al. | |
| 9,481,373 B2 | 11/2016 | Basir et al. | |
| 10,057,453 B2 | 8/2018 | Dupas | |
| 10,139,237 B2 | 11/2018 | Outwater et al. | |
| 10,747,868 B2 | 8/2020 | Bock et al. | |
| 2010/0246902 A1 | 9/2010 | Rowe et al. | |
| 2013/0257590 A1 | 10/2013 | Kuenzi et al. | |

(Continued)

FOREIGN PATENT DOCUMENTS

| | | |
|---|---|---|
| CN | 204206225 U | 3/2015 |
| CN | 104992364 A | 10/2015 |

(Continued)

OTHER PUBLICATIONS

Chainway, "V600 Vehicle Computer", 2018, Nineteen (19) pages.

(Continued)

*Primary Examiner* — Ruiping Li
(74) *Attorney, Agent, or Firm* — Crowell & Moring LLP

(57) ABSTRACT

Vehicle event detection and reporting systems and methods include sensor systems that capture event data from which events involving the vehicle are determined, the sensor systems including a driver facing camera that captures images of a driver's seat area. The driver facing camera also captures images of a barcode presented to the driver facing camera, and the detected events are associated with a driver identification determined from the captured image of the barcode.

14 Claims, 3 Drawing Sheets

(56) References Cited

U.S. PATENT DOCUMENTS

| | | |
|---|---|---|
| 2014/0266623 A1 | 9/2014 | Graumann et al. |
| 2014/0304173 A1 | 10/2014 | Ernsdorff |
| 2016/0147990 A1 | 5/2016 | Schneider |
| 2017/0001598 A1 | 1/2017 | Pophale et al. |
| 2017/0206717 A1 | 7/2017 | Kuehnapfel |
| 2018/0131767 A1 | 5/2018 | Kozman et al. |
| 2019/0325544 A1 | 10/2019 | Sweet |
| 2020/0150660 A1 | 5/2020 | Kim et al. |

FOREIGN PATENT DOCUMENTS

| | | |
|---|---|---|
| CN | 108995627 A | 12/2018 |
| CN | 104601692 B | 6/2019 |
| EP | 1 448 952 B1 | 8/2004 |
| EP | 1 656 289 B1 | 5/2006 |
| EP | 3 324 573 A1 | 5/2018 |
| FR | 2 682 206 A1 | 4/1993 |
| GB | 2568859 A | 6/2019 |
| KR | 100195486 B1 | 7/1998 |
| WO | WO 2012/128478 A2 | 9/2012 |
| WO | WO 2017/163136 A1 | 9/2017 |
| WO | WO2018/039646 * | 3/2018 |
| WO | WO 2018/039646 A1 | 3/2018 |
| WO | WO 2018/082832 A1 | 5/2018 |
| ZA | 2009/00826 B | 12/2009 |

OTHER PUBLICATIONS

Lytx, "New Driver Identification Solution from Lytx Helps Make the Job Easier and Faster for Fleet and Safety Managers", Lytx Badge, Mar. 26, 2020, Five (5) pages.

Via Technologies, Inc., "VIA Fleet Cloud Management Portal: Setup in Five Easy Steps", Jun. 10, 2020, Eight (8) pages.

Lytx, "Lytx DriveCam: Intelligent dash cam technology", URL: https://www.lytx.com/en-us/fleet-management/drivecam, Lytx DriveCam Event Recorder, May 11, 2020, Fourteen (14) pages.

VIA Technologies, Inc., "Setting up the VIA Fleet Cloud Management Portal", URL: https://www.viatech.com/en/2020/06/via-mobile360-fleet-cloud-management-portal/, Jun. 17, 2020, Seventeen (17) pages.

Nevon Projects, "Driver Card With Qr Code Identification", URL: https://nevonprojects.com/driver-card-with-qr-code-identification/, obtained on Nov. 7, 2020, Seven (7) pages.

Inlite Research, "Read Driver License barcode and decode data", URL: https://how-to.inliteresearch.com/barcode-reading-howto/read-driver-license-barcodes/, obtained on Nov. 7, 2020, Three (3) pages.

Nedap, "NVITE", URL: https://www.nedapidentification.com/products/nvite/nvite/, obtained on Nov. 7, 2020, Five (5) pages.

Fleetify, "DriverID", URL: https:/fleetify.co.uk, obtained on Nov. 7, 2020, Six (6) pages.

* cited by examiner

SYSTEMS AND METHODS FOR DRIVER IDENTIFICATION USING DRIVER FACING CAMERA OF EVENT DETECTION AND REPORTING SYSTEM

FIELD OF THE INVENTION

The invention relates to vehicle event detection and reporting systems and methods, which include sensor systems that capture event data from which events involving the vehicle are determined, the sensor systems including a driver facing camera that captures images of a driver's seat area. The invention more particularly relates to using the driver facing camera to also capture images of a barcode presented to the driver facing camera, and associate the detected events with a driver identification determined from the captured image of the barcode.

BACKGROUND

Fleets of commercial vehicles currently utilize driver/vehicle event monitoring systems to detect events associated with the vehicles and/or their drivers. These monitoring systems often include sensors on the vehicle from which relevant events can be detected. Driver facing cameras have recently been used as such sensors, where image recognition processing of the video data from these cameras can be used to detect events in the vehicle cabin.

The current approaches for associating detected events with individual drivers typically involves requiring drivers to log-in to a vehicle telematics system prior to operating the vehicle for a working period, during which detected events are associated with the logged-in driver. The driver logs-in by one of two ways. The first requires the driver to enter a username and password via a console unit. The second involves taking an image of the driver via the driver facing camera, which is then processed via facial recognition to confirm driver identity in lieu of the username/password entry.

Each of these approaches is problematic in its own way. With the username/password entry approach, it is difficult to verify that the driver entering the username/password is in fact the authorized driver. The facial recognition approach is more rigorous, but requires additional processing resources, regular updating of image recognition databases, unnecessarily transmitting driver images to a backend server or otherwise image processing on-board every time the driver logs-in, and potentially has undesirable physiological effects on drivers.

As such, there is a need in the art for a system and method that overcomes the aforementioned drawbacks.

SUMMARY OF THE INVENTION

The invention relates to vehicle event detection and reporting systems and methods, which include sensor systems that capture event data from which events involving the vehicle are determined, the sensor systems including a driver facing camera that captures images of a driver's seat area. The invention more particularly relates to using the driver facing camera to also capture images of a barcode presented to the driver facing camera, and associate the detected events with a driver identification determined from the captured image of the barcode.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

Figure 1:
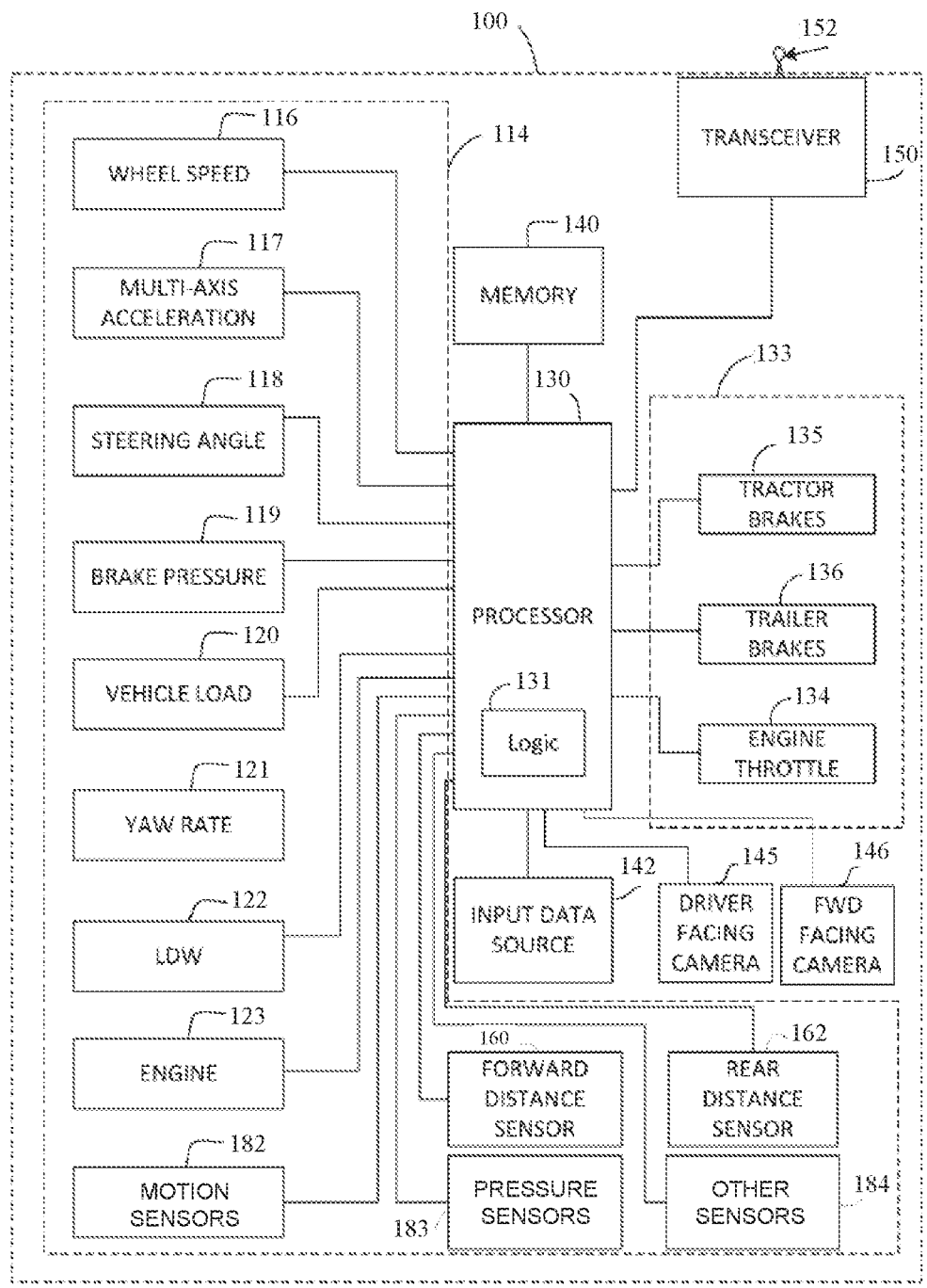
FIG. 1 is a block diagram that illustrates a vehicle-based event detection and reporting system configured to implement one or more aspects of the invention.

In the following description of the present invention, reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

In at least some embodiments, the invention relates to vehicle event detection and reporting systems and methods, which include sensor systems that capture event data from which events involving the vehicle are determined, the sensor systems including a driver facing camera that captures images of a driver's seat area. The invention more particularly relates to using the driver facing camera to also capture images of a barcode presented to the driver facing camera, and associate the detected events with a driver identification determined from the captured image of the barcode.

As used herein, the term "barcode" refers individually and collectively to barcodes, QR codes, optical character recognition (OCR) readable text, and any other printed codes and/or symbols, which can be optically detected or otherwise "read" by an appropriate reader, scanner, or other digital device configured to capture an image of the barcode and determine identifying information therefrom.

Accordingly, in certain embodiments, the invention may be implemented by the on-vehicle event detection and reporting system, which may include one or more driver facing cameras that are configured such that the field of view of the cameras capture a view the driver of the vehicle, and/or a view of other areas of the cabin, such as the driver controls of the vehicle while driving and non-driver passenger areas. Still other embodiments may include cameras configured to capture other scenes relative to the vehicle. For instance, embodiments may include cameras configured to capture the scene in front of the vehicle, behind the vehicle, to either side of the vehicle, etc.

The event detection and reporting system may be configured to collect, analyze and communicate event data, including video and non-video event data, corresponding to a detected driver and/or vehicle related event occurring at a particular point in time during a driving excursion. Such event data can include data collected from components of, or components interacting with, the event detection and reporting system.

From the event data, the event detection and reporting system can detect, in real time, driver and/or vehicle-related events (hereinafter "events") that happen over the course of a driving excursion, or even outside of the driving excursion. The events and/or the event data can be recorded, stored, reported to, collected by, or otherwise communicated internally and/or externally by the event detection and reporting system, as discussed further herein. Accordingly, the event data can include data from which events can be detected. It will be appreciated, however, that the event data can also can include data that corresponds to the detected event but is not used to detect the event (e.g., driver facing camera captured image data corresponding in time to a lane departure event detected via LDW system data, etc.).

Examples of events that may be detected, reported to and/or collected by the event detection and reporting system in real time include: safety events, for example and without limitation, excessive acceleration, excessive braking, exceeding speed limit, excessive curve speed, excessive lane departure, lane change without turn signal, loss of video tracking, LDW system warning, following distance alert, forward collision warning, collision mitigation braking, collision occurrence, etc., and non-safety events, for example and without limitation, the driver logging in/out of a vehicle telematics system, the driver/passenger entering/leaving the vehicle, the driver/passenger occupying/vacating the bunk area, the driver occupying/vacating the driver seat, the vehicle engine being on/off, the vehicle gear being in park/drive, the parking brake being on/off, etc. Non-safety events may also include theft events, for example and without limitation, the presence of an unauthorized occupant accessing the vehicle, etc.

The event detection and reporting system may use data collected directly from vehicle components (e.g., devices, sensors, or systems), and data collected from an analysis of image and/or video data, to generate event datasets that correspond in time with one or more detected events. For example, non-video event data, generated in connection with a detected event determined from processing captured non-video event data, may be associated with captured video frames whose timeline spans or overlaps the time when the non-video event data was detected/collected. Video event data, generated in connection with a detected event determined from processing of captured vehicle video frames, may at least be associated with the captured video frames from which it was generated. The video event data may also be associated with other captured video frames whose timelines span or overlap the time when the event was detected/collected. In these scenarios, the time may be calculated based on the video frame or frames from which the event object was derived. The video event data may, additionally or alternatively, be associated with non-video event data whose timelines span or overlap the time when the event was detected/collected.

One or more records of the detected events and/or the event data sets generated for the detected events may be stored in association with individual and/or teams of drivers logged into the vehicle telematics system during the occurrence of the event, or otherwise during a timespan associated with the event. For example, the one or more records can be associated with the most recent driver(s) logged into the vehicle telematics system prior to the occurrence of an event. In particular, the one or more records of events and/or data sets may be associated with driver identification data of the driver(s) in accordance with the driver(s) log in history. In other words, the driver(s) logged into the vehicle telematics system at the time of the detected event (or during the associated timespan) may be associated with the record of the event and/or event data sets generated for the event. Accordingly, events may be detected, recorded and reported as being associated with the appropriate driver(s) based at least partially on the driver identification data used to log into the vehicle telematics system.

Referring first to FIG. 1, by way of overview a schematic block diagram is provided illustrating details of an event detection and reporting system 100 configured to be used in accordance with one or more exemplary embodiments of the invention. The in-vehicle event detection and reporting system 100 may be adapted to detect a variety of operational parameters and conditions of the vehicle and the driver's interaction therewith (i.e., event data) and, based thereon, to determine if a driving or vehicle event has occurred (e.g., if one or more operational parameter/condition thresholds has been exceeded). Data related to detected events (i.e., event data) may then be stored and/or transmitted to a remote location/server.

The event detection and reporting system 100 of FIG. 1 may include one or more devices or systems 114 for providing vehicle-related and/or driver-related input data indicative of one or more operating parameters or one or more conditions of a commercial vehicle, its surroundings and/or its cabin occupants. Alternatively, the event detection and reporting system 100 may include a signal interface for receiving signals from the one or more devices or systems 114, which may be configured separate from system 100. For example, the devices 114 may be one or more sensors, such as but not limited to, one or more wheel speed sensors 116, one or more acceleration sensors such as multi-axis acceleration sensors 117, a steering angle sensor 118, a brake pressure sensor 119, one or more vehicle load sensors 120, a yaw rate sensor 121, a lane departure warning (LDW) sensor or system 122, one or more engine speed or condition sensors 123, and a tire pressure (TPMS) monitoring system (not shown). The event detection and reporting system 100 may also utilize additional devices or sensors, including for example a forward distance sensor 160 and a rear distance sensor 162 (e.g., radar, lidar, etc.). Additional sensors for capturing driver-related data may include one or more video and/or motion sensors 182, pressure or proximity sensors 183 located in one or more seats and/or driver controls (e.g., steering wheel, pedals, etc.), or other sensors 184 configured to capture driver-related data. Other sensors, actuators and/or devices or combinations thereof may be used of otherwise provided as well, and one or more devices or sensors may be combined into a single unit as may be necessary and/or desired.

The event detection and reporting system 100 may also include brake light(s) and/or notification devices, which may be usable to provide headway time/safe following distance warnings, lane departure warnings, and warnings relating to braking and or obstacle avoidance events.

The event detection and reporting system 100 may also include a logic applying arrangement such as a controller or processor 130 and control logic 131, in communication with the one or more devices or systems 114. The processor 130 may include one or more inputs for receiving input data from the devices or systems 114. The processor 130 may be adapted to process the input data and compare the raw or processed input data to one or more stored threshold values or desired averages, or to process the input data and compare the raw or processed input data to one or more circumstance-dependent desired value, so as to detect one or more driver and/or vehicle related events.

The processor 130 may also include one or more outputs for delivering a control signal to one or more vehicle systems 133 based on the comparison, i.e., the detection of the event(s). The control signal may instruct the systems 133 to provide one or more types of driver assistance warnings (e.g., warnings relating to braking and or obstacle avoidance) and/or to intervene in the operation of the vehicle to initiate corrective action. For example, the processor 130 may generate and send the control signal to an engine electronic control unit or an actuating device to reduce the engine throttle 134 and slow the vehicle down. Further, the processor 130 may send the control signal to one or more vehicle brake systems 135, 136 to selectively engage the brakes (e.g., a differential braking operation). A variety of corrective actions may be possible and multiple corrective actions may be initiated at the same time. It will be understood that such corrective actions need not be contemporaneous with detected events, and may, additionally or alternatively, be responsive to one or more historical records of detected events.

The event detection and reporting system 100 may also include a memory portion 140 for storing and accessing system information, such as for example the system control logic 131. The memory portion 140, however, may be separate from the processor 130. The sensors 114 and processor 130 may be part of a preexisting system or use components of a preexisting system.

The event detection and reporting system 100 may also include a source of vehicle-related input data 142 indicative of a configuration/condition of a commercial vehicle. The processor 130 may sense or estimate the configuration/condition of the vehicle based on the input data, and may select a control tuning mode or sensitivity based on the vehicle configuration/condition. The processor 130 may compare the operational data received from the sensors or systems 114 to the information provided by the tuning.

In addition, the event detection and reporting system 100 is operatively coupled with one or more driver facing imaging devices, shown in the example embodiment for simplicity and ease of illustration as a single driver facing camera 145 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 100 such as a forward facing camera 146 to record images of the roadway ahead of the vehicle. In the example embodiments, driver-related data can be collected directly using the driver facing camera 145, such driver data including driver head position, hand position, postural attitude and location, or the like, within the vehicle being operated by the vehicle. In addition, driver identity can be determined based on facial recognition technology and/or body/posture template matching.

In operation, the driver facing camera 145 may video data of the captured image area. The video data may be captured on a continuous basis, or in response to a detected event. Such data may comprise a sequence of video frames with separate but associated sensor data that has been collected from one or more on-vehicle sensors or devices, as detailed herein.

Still yet further, the event detection and reporting system 100 may also include a transmitter/receiver (transceiver) module 150 such as, for example, a radio frequency (RF) transmitter including one or more antennas 152 for wireless communication of the automated control requests, GPS data, one or more various vehicle configuration and/or condition data, or the like between the vehicles and one or more destinations such as, for example, to one or more services (not shown) having a corresponding receiver and antenna. The transmitter/receiver (transceiver) module 150 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 is operative to combine selected ones of the collected signals from the sensor systems described herein into processed data representative of higher level vehicle condition data such as, for example, data from the multi-axis acceleration sensors 117 may be combined with the data from the steering angle sensor 118 to determine excessive curve speed event data. Other hybrid event data relatable to the vehicle and driver of the vehicle and obtainable from combining one or more selected raw data items from the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, average ACC usage event data, and late speed adaptation (such as that given by signage or exiting).

The event detection and reporting system 100 of FIG. 1 is suitable for executing embodiments of one or more software systems or modules that perform or otherwise cause the performance of one or more features and aspects of the event detection and reporting system 100. The example event detection and reporting system 100 may include a bus or other communication mechanism for communicating information, and a processor 130 coupled with the bus for processing information. The computer system includes a main memory 140, such as random access memory (RAM) or other dynamic storage device for storing instructions and loaded portions of the trained neural network to be executed by the processor 130, and read only memory (ROM) or other static storage device for storing other static information and instructions for the processor 130. Other storage devices may also suitably be provided for storing information and instructions as necessary or desired.

Instructions may be read into the main memory 140 from another computer-readable medium, such as another storage device of via the transceiver 150. Execution of the sequences of instructions contained in main memory 140 causes the processor 130 to perform the process steps described herein. In an alternative implementation, hard-wired circuitry may be used in place of or in combination with software instructions to implement the invention. Thus, implementations of the example embodiments are not limited to any specific combination of hardware circuitry and software.

Figure 2:
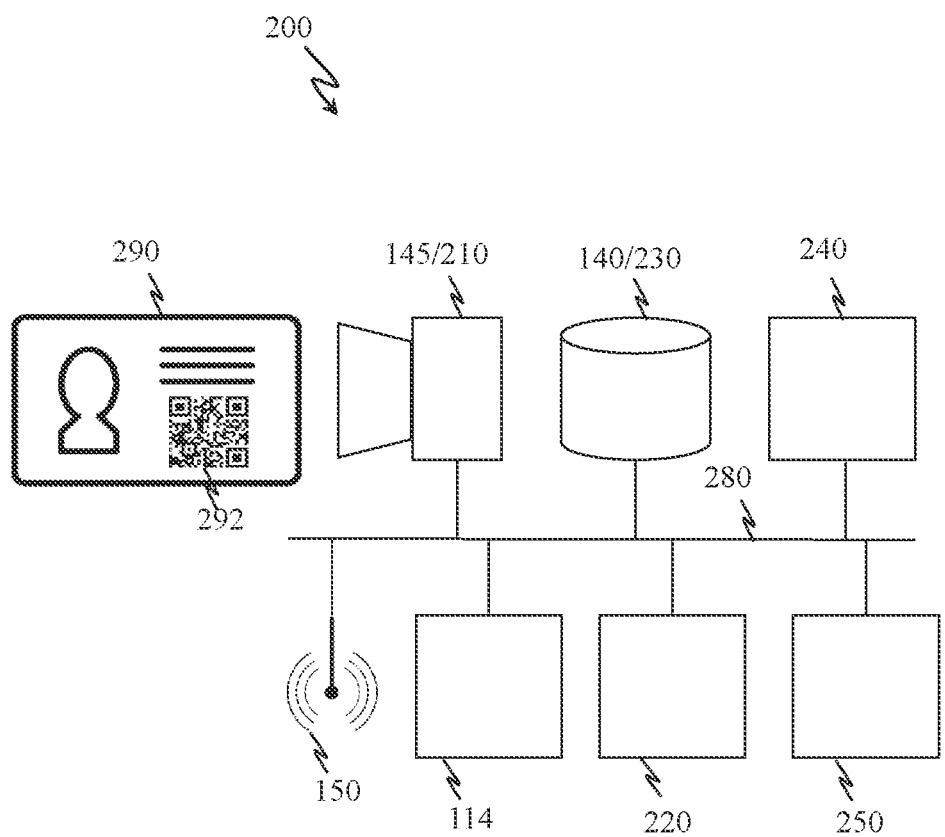
FIG. 2 is a schematic diagram of an exemplary architecture of the event detection and reporting system according to one or more aspects the invention.

Referring now to FIG. 2, a simplified schematic block diagram is provided illustrating details of a system architecture 200 for associating a driver with event data using the driver facing camera 145 of an event detection and reporting system 100.

The driver facing camera 145 is configured to provide data indicative of one or more operating parameters or one or more conditions related to a commercial vehicle and/or drivers and passengers thereof, as discussed with reference to FIG. 1. In particular, the driver facing camera 145 is configured to detect or otherwise collect driver-related data from which a driver identity and/or position can be determined. The capturing of driver-related data may include capturing images of the driver's seat area of the vehicle cabin, and may also include capturing other areas of the vehicle cabin. The driver-related data may include driver head position, hand position, location within the vehicle, postural attitude, or the like. Passenger or other occupant data can be similarly detected and collected. Such driver facing camera 145 collected data can be collected as event data in accordance with aspects of the event detection and reporting system discussed with reference to FIG. 1.

The driver facing camera 145 is further configured to function as a barcode reader 210. The driver facing camera 145 accordingly can capture one or more images of the barcode 292 that is presented to the field of view of the driver facing camera 145. The barcode 292 may be located on an identification card 290 or the like, and may correspond to or otherwise encode the driver identification data. The driver identification data may be data unquietly associated with or assigned to (e.g., at the remote server) an individual driver or set of drivers. The captured barcode 292 can be used to determine, or otherwise decode, the driver identification data corresponding to, or otherwise coded within, the barcode 292.

The system architecture 200 may further include a driver identification module 220 configured to determine the driver identification data from the captured barcode 292. The driver identification module 220 may be embodied in the processor and/or in the remote location/server. The driver identification module 220 may further be configured to log the driver to into and/or out of the vehicle telematics system using the determined driver identification data.

The system architecture 200 may further include a database 230 configured to store and manage the storage of data in memory 140. The database 230 may store a record or log of driver log-in data, which may include the driver identification data used for vehicle telematics system log-in and/or log-out events, each associated with a corresponding timestamp reflecting the time of the respective log-in and/or log-out. The driver log-in data may thus reflect a historical record of driver log-in and/or log-out activity, which can be used to associate detected events or event data sets with individual drivers based on the driver identification data that is recorded as being logged-in during the timespan associated with the detected event.

The system architecture 200 may further include an event association module 240 configured to associate the driver identification data with one or more detected events, based on the driver log-in data. In particular, one or more of the detected events and/or event data sets may include associated timestamps reflecting one or more timeframes associated with the detected event. A detected event can be associated with timeframes that are before, during and/or after the event. The event association module 240 may compare the timeframes associated with the event to the driver log-in data, particularly the timestamps thereof, to determine the driver identification data having timestamps corresponding to the timeframes. That is, the event association module 240 can determine which driver was logged into the vehicle telematics system during the timeframe(s) of the detected event by checking the log-in timestamps. Accordingly, events may be detected, recorded and reported as being associated with the appropriate driver(s) based at least partially on the driver identification data used to log into the vehicle telematics system via the barcode reader 210.

The event detection and reporting system 100, e.g., via the processor, may further control one or more vehicle systems based on historical events associated with the driver. Such vehicle systems may include, one or more driver assistance systems (e.g., LDW systems, autonomous control, etc.), driver monitoring systems (e.g., in-cabin camera recording, etc.), vehicle access systems (e.g., ignition control, etc.), where control of such vehicle systems may include adjusting one or more parameters thereof. Accordingly, a historical record of events associated with the driver may be stored at the remote server and/or on-vehicle. In some embodiments, vehicle systems parameters adjusted for each driver based on the historical events associated with the respective driver are stored in the memory 140. These parameters may be updated based on data received from the remote server.

In some embodiments, the driver log-in data may include an image of the driver, which may be captured by the driver facing camera 145 or other camera. The driver image may be captured at the time of the vehicle telematics system log-in event, or at any time during which the driver is logged-in (i.e., between log-in and log-out events). The captured driver image can be stored in association with the timestamp and driver identification data, and can be used to verify the authenticity of the log-in event. In particular, the captured driver image may be compared to a reference driver image, so as to determine whether the barcode 292 presented to the driver facing camera 145 was presented by the driver with whom the corresponding driver identification data is associated. The reference driver image may be stored in the memory 140 and/or the remote server for verification of log-in events.

The system architecture 200 may therefore further include a driver authentication module 250, which may be configured to verify log-in event authenticity based on the captured driver image. The driver authentication module 250 may be embodied in the processor and/or in the remote location/server. The authenticity verification can include automated facial recognition, display of the captured image to a human user for comparison to the reference image, and/or any other verification that is based on the captured driver image.

In at least one embodiment, the driver authentication module 250 verifies the authenticity of the log-in event where the log-in event is associated with detected events or event data sets (e.g., a lane departure, collision, etc.) to be recorded and/or reported as being associated with the driver. However, the log-in event verification need not occur for every log-in event, but rather can be done retrospectively for log-in events associated with detected vehicle-related and/or driver-related events being recorded and/or reported, or a subset thereof. The log-in event verification may also, alternatively or additionally, be done on a periodic, scheduled, on-demand or random basis that may be independent of event detection. For example, log-in event verification may be done to spot check that drivers are using the correct identification card 290 to log-in to the vehicle telematics system.

The barcode reader 210, driver identification module 220, database 230, event association module 240, and driver authentication module 250 may be communicatively coupled via a data bus 280, which may further be coupled to one or more of the components discussed with reference to FIG. 1. The data bus 280 may comprise a wired and/or wireless communication network configured to transmit data between and/or among the various modules and corresponding components, so as to facilitate of the functions described herein, and may therefore further comprise the transceiver 150.

Figure 3:
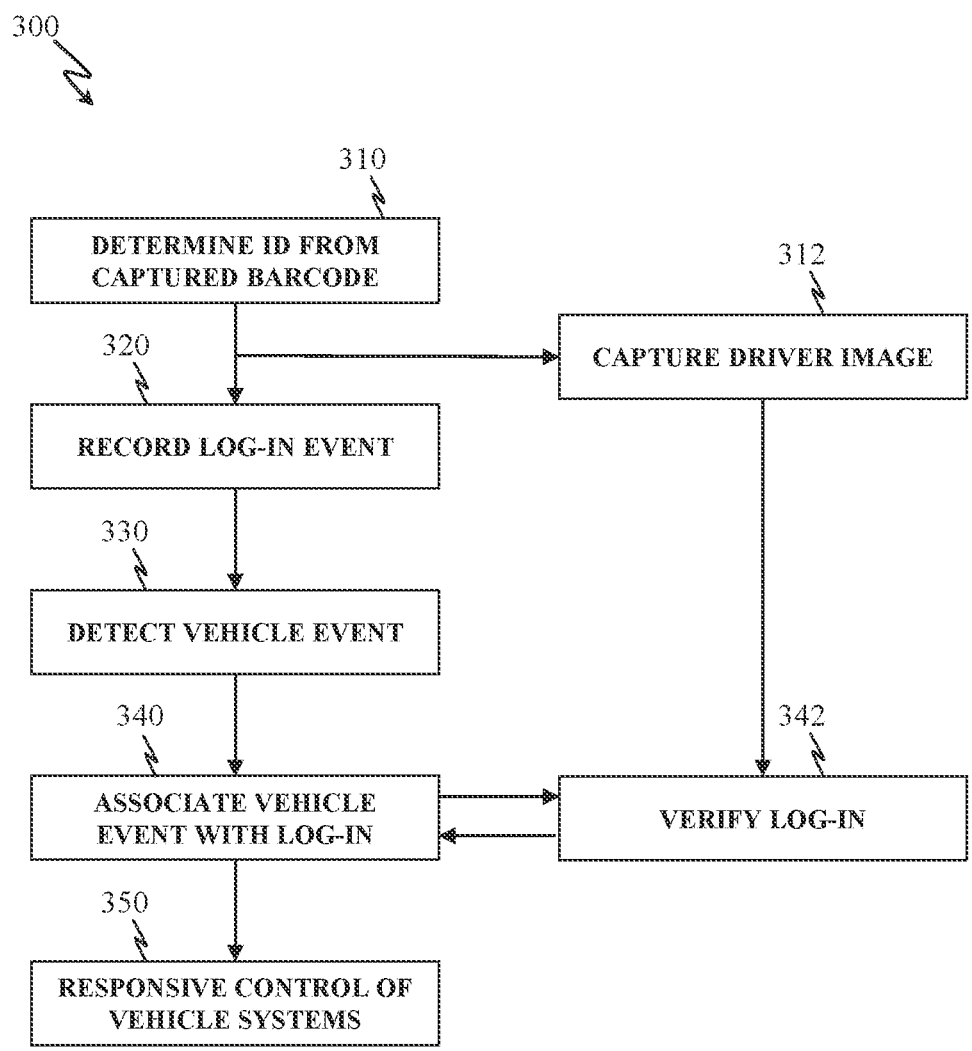
FIG. 3 illustrates an exemplary process for implementing one or more aspects of the event detection and reporting system.

FIG. 3 illustrates an exemplary process 300 for associating a driver with event data using the driver facing camera 145 of the event detection and reporting system. It should be understood that one or more of the described steps may be omitted, that additional steps may be added, and that the order of steps may be changed, without departing from the principles of the invention disclosed herein. It should also be understood that, while the process 300 (or functions) thereof may be described herein as fully or partially executed within the vehicle, or by components thereof, some or all of the process 300 may, additionally or alternatively, be fully or partially executed at the remote server via transmission of the relevant data over one or more data networks communicatively coupling the vehicle to the remote server.

At step 310, the driver may log-into the vehicle telematics system via presenting the barcode 292 to the driver facing camera 145. The barcode 292 may be printed on the driver identification card 290 and may correspond to or otherwise encode the driver identification data that is unquietly associated with or assigned to (e.g., at the remote server) the driver or set of drivers. The driver identification data may be determined from the captured barcode 292, and used to log-in the driver to the vehicle telematics system (i.e., the log-in event) based on the determined driver identification data, as described herein.

At step 312, an image of the driver may be captured by the driver facing camera 145. As discussed herein, the driver image may be captured at the time of the vehicle telematics system log-in event, or at any time during which the driver is logged-in (i.e., between log-in and log-out events). The captured driver image can be stored in association with timestamp and driver identification data, and can be used to verify the authenticity of the vehicle telematics system log-in event.

At step 320, a record of the log-in event may be stored in the database 230 as driver log-in data, which may include the driver identification data and corresponding timestamps reflecting the time of the log-in event. In some embodiments, log-out events may be similarly stored in the database 230 as driver log-out data, with the time period between log-in and log-out events sometimes being referred to a working period. For simplicity, driver log-in data is used herein to refer, both individually and collectively, as the case may be, to driver log-in data and driver log-out data. The driver log-in data may thus reflect a historical record of working periods.

As discussed herein, the driver facing camera 145 operates as the barcode reader 210 for driver log-in to the vehicle telematics system. However, as described herein, the driver facing camera 145 also functions as a sensor of the event detection and reporting system, capturing images of the driver's seat area at least as event data.

Accordingly, at step 330, the event detection and reporting system may detect one or more events from the event data. Each of the events may be stored in association with one or more timespans relevant to the detected event. For example, where a collision event is detected, the collision event may be associated with a timespan from shortly before the collision event to shortly after. As another example, where cabin break-in event is detected, the break-in event may be associated with a timespan that includes when the driver last exited the vehicle prior to the break-in event.

At step 340, the driver identification data may be associated with one or more detected events, based on the driver log-in data. As discussed herein, one or more of the detected events and/or event data sets may include associated timestamps reflecting one or more timeframes associated with the detected event, which can be compared to timeframes that are before, during and/or after the event to determine which driver was logged into the vehicle telematics system during the timeframe(s) of the detected event.

At step 342, the log-in event may be authenticated based on the captured driver image. As discussed herein, the authentication of the log-in event can include automated facial recognition, display of the captured driver image to an administrative user for comparison to the reference image, and/or any other verification that is based on the captured driver image. The log-in event verification may be done on a periodic, scheduled, on-demand or random basis, and/or may be done in response to or independent of detected events.

At step 350, one or more vehicle systems may be controlled based on a record of historical events associated with the driver. Such vehicle systems may include, one or more driver assistance systems (e.g., LDW systems, autonomous control, etc.), driver monitoring systems (e.g., in-cabin camera recording, etc.), vehicle access systems (e.g., ignition control, etc.), where control of such vehicle systems may include adjusting one or more parameters thereof.

In this manner, the driver facing camera 145 of an event detection and reporting system can be used to easily and efficiently log-in a driver to a vehicle telematics system and associate the driver with detected events.

As used herein, the terms "camera" or "cameras" are intended to refer to any and all digital imaging devices, including but not limited to cameras. Moreover, references to "driver," "passenger," and "occupant," should be understood to be interchangeable, and the principles of the invention understood to apply as appropriate to each.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described herein with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 130 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition, and further in accordance with the descriptions herein, the terms "logic" and "module," as used herein, includes hardware, firmware, software in execution on a machine, and/or combinations of each to perform a function(s) or an action(s), and/or to cause a function or action from another logic, method, and/or system. Such logic or modules may include one or more software controlled microprocessors, a discrete logic (e.g., ASIC), an analog circuit, a digital circuit, a programmed logic device, a memory device containing instructions, and so on. Such logic or modules further may include one or more gates, combinations of gates, or other circuit components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An event detection and reporting system for a vehicle, comprising:
    one or more sensor systems configured to capture event data corresponding to an event involving the vehicle, wherein the one or more sensor systems includes a driver facing camera configured to capture images of a driver's seat area and of a barcode presented to the driver facing camera; and
    a processor, configured to:
        detect the event from the event data, wherein the detected event is associated with a timespan during which the detected event occurred,
        record a telematics log-in based on a driver identification determined from the captured image of the barcode, and
        associate the detected event with the driver identification by comparing a timestamp of the telematics log-in to the timespan associated with the detected event.

2. The system of claim 1, wherein the processor is further configured to determine the driver identification from the captured image of the barcode.

3. The system of claim 1, further comprising:
    a transceiver configured to receive the driver identification from a remote server, wherein the driver identification is determined by the remote server from the captured image of the barcode.

4. The system of claim 1, wherein associating the detected event with the driver identification includes associating an event data set, including at least a portion of the event data, with the driver identification.

5. The system of claim 1, wherein the processor is further configured to associate one or more images of the driver, captured by the driver facing camera at least contemporaneously with the barcode, with the determined driver identification.

6. The system of claim 5, wherein the processor is further configured to verify the driver identification as corresponding to the driver, based on the captured image of the driver, in response to detecting the event, periodically, and/or on-demand.

7. An event detection and reporting method, comprising:
    capturing event data via one or more sensor systems, the event data corresponding to an event involving the vehicle, wherein the one or more sensor systems includes a driver facing camera configured to capture images of a driver's seat area;
    capturing an image of a barcode presented to the driver facing camera during a vehicle telematics system log-in event;
    recording the telematics log-in based on a driver identification determined from the captured image of the barcode;
    detecting, via a processor of the vehicle, the event from the event data, wherein the detected event is associated with a timespan during which the detected event occurred; and
    associating the detected event with the driver identification by comparing a timestamp of the telematics log-in to the timespan associated with the detected event.

8. The method of claim 7, further comprising:
    determining, via the processor, the driver identification from the captured image of the barcode.

9. The method of claim 7, further comprising:
    receiving, via a transceiver, the driver identification from a remote server, wherein the driver identification is determined by the remote server from the captured image of the barcode.

10. The method of claim 7, wherein associating the detected event with the driver identification includes associating an event data set, including at least a portion of the event data, with the driver identification.

11. The method of claim 7, further comprising:
    recording, via the processor, a telematics log-in event based on the driver identification determined from the captured image of the barcode.

12. The method of claim 11, wherein associating the detected event with the driver identification includes comparing a timespan associated with the detected event to a timestamp of the telematics log-in event.

13. The method of claim 7, further comprising:
    associating, via the processor, one or more images of the driver, captured by the driver facing camera at least contemporaneously with the barcode, with the determined driver identification.

14. The method of claim 13, further comprising:
    verifying, via the processor, the driver identification as corresponding to the driver, based on the captured image of the driver, in response to detecting the event, periodically, and/or on-demand.

* * * * *